June 2, 1953  R. O. SEITZ  2,640,870
METHOD OF AND APPARATUS FOR ANALYZING GASES
Filed Dec. 2, 1949  2 Sheets-Sheet 1

INVENTOR
RUDOLPH O. SEITZ
BY
*Pennie Edmonds Morton Barrows*
ATTORNEYS

June 2, 1953  R. O. SEITZ  2,640,870
METHOD OF AND APPARATUS FOR ANALYZING GASES
Filed Dec. 2, 1949  2 Sheets-Sheet 2

INVENTOR
RUDOLPH O. SEITZ
BY
ATTORNEYS

Patented June 2, 1953

2,640,870

UNITED STATES PATENT OFFICE 2,640,870

METHOD OF AND APPARATUS FOR ANALYZING GASES

Rudolph O. Seitz, East Orange, N. J., assignor to Air Reduction Company, Incorporated, New York, N. Y., a corporation of New York Application December 2, 1949, Serial No. 130,617

10 Claims. (Cl. 175—183)

This invention relates to a method of and apparatus for determining the proportion of impurities in gases and particularly to an improved procedure whereby such determination can be made continuously as the gas flows from its source to a storage container or the point where it is utilized. The invention depends upon the facts that, when a constant current is supplied to an arc of predetermined length maintained in the gas stream, the voltage of the arc and the temperature rise in the gas will vary proportionally with variations in the percentage of impurities which may be present.

It has been proposed heretofore to determine the impurities present in a gas by measuring the breakdown voltage of the gas. This is an instantaneous value which cannot be indicated continuously, as in the present method. Similarly, a method is known in which the time-dependent characteristics of the gas are measured by completing or interrupting an arc circuit to determine the proportion of impurities, but this also does not permit continuous measurement.

In the production of gases for commercial purposes, it is generally necessary to hold the impurities present within quite narrow limits. Since the quality of the gas may vary at its source, it is desirable to make continuous determinations of the presence of impurities as the gas flows from its source. Such a check upon the impurities prevents contamination of the gas previously delivered, and the delivery of gas which does not meet the specification for impurities.

It is the object of the present invention to provide a simple and effective method and suitable apparatus whereby the flow of gas may be observed continuously and checked for impurities which may be present therein.

Other objects and advantages of the invention will be apparent as it is better understood by reference to the following specification and the accompanying drawing, in which Fig. 1 is an elevation illustrating the apparatus employed;

Figure 1:
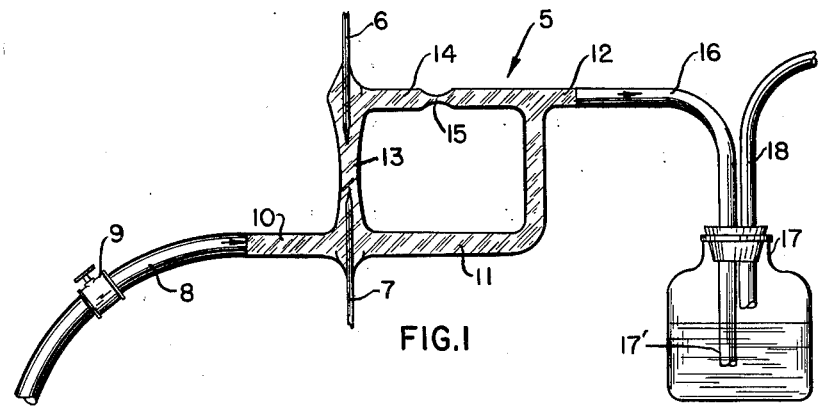
Figure 2:
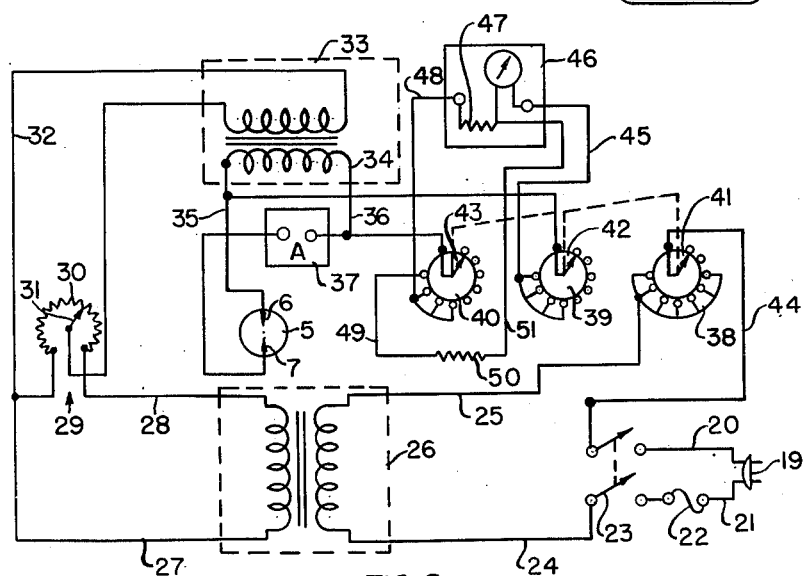
Fig. 2 is a diagram showing the electrical circuit.

As previously indicated, the invention depends upon the maintenance of an arc within the gas stream by the application of a current of uniform value and the continuous measurement of the arc voltage which reflects the percentage of impurities because the arc voltage rises in proportion to the increase in impurities to an extent which is readily observable on the voltmeter. Alternatively, the temperature rise in the gas may be determined by use of a thermocouple and voltmeter. Thus, by observing the voltmeter, the operator can immediately determine any substantial increase in the impurities and take the necessary steps to correct the condition. In accordance with the method as hereinafter described, the arc current and gap length are constant. The total power or energy produced in the arc is dependent upon the quality or purity of the gas surrounding the arc. The power dissipation or energy is reflected in two ways, i. e., as voltage or temperature. The measurement of either will afford a clear indication of impurities present in the gas. Since the arc characteristics will vary somewhat with the pressure of the gas, it should be supplied at a substantially constant pressure. Means for regulating the pressure of a gas are well known and form no part of the present invention.

The invention is primarily intended for application to the manufacture of argon, the principal impurity in which is nitrogen. It is applicable also to the determination of nitrogen or other impurities in other more or less inert gases. And it is useful in any case where chemical action in the arc which would disturb the results does not occur. Even in such cases, suitable calibration of the apparatus would permit satisfactory determination of the impurities.

The method is extremely sensitive where applied to its principal purpose, that is, the determination of nitrogen in argon. The rise in voltage due to the presence of nitrogen is marked, even with relatively small percentages of the impurity. Hence the operator can determine continuously and certainly the presence of any such contamination in the gas flowing through the apparatus. By reference to a graph previously prepared, and based upon observation of the voltage obtained when samples of known composition pass through the apparatus, the readings of the voltmeter can be readily translated into percentages of the impurity. Similarly, by the preparation of such graphs after observation of the voltage with samples of known composition, the percentage of other impurities in various gases can be readily ascertained.

Referring to the drawing, 5 indicates generally an apparatus suitable for the practice of the invention. It is preferably made of glass, so that the arc can be readily observed. Electrodes 6 and 7 are sealed through the walls of the glass tubing with the ends in spaced relation. The electrodes are preferably pointed, as indicated in the drawing, in order to stabilize the arc. If the electrodes have flat or rounded ends, there is a tendency of the arc to follow a path which is not so uniform as in the case of pointed electrodes. The gas is introduced from any suitable source through a flexible tube 8 having a valve 9 to an inlet 10. The major portion of the gas flows through the passage 11 to the outlet 12. A portion of the gas is diverted, however, through a by-pass 13 and thence through a passage 14 which is constricted at 15 to limit the flow through by-pass 13 and thus to produce about the ends of the electrodes 6 and 7 a zone in which turbulence is reduced to a minimum, thus avoiding distortion of the arc. The gas from the outlet 12 is delivered through a flexible tube 16 and submerged inlet 17' to a closed vessel 17 containing a liquid such as dibutyl phthalate, and thence through a tube 18 to the point of storage or use. The purpose of the liquid is to prevent air from passing back through the apparatus to the arc. A liquid such as water or other material of low vapor pressure is not suitable for this purpose, since moisture would thereby be permitted to enter the apparatus and interfere with the results. Any liquid similar to dibutyl phthalate, particularly with respect to its high vapor pressure, may be utilized.

To maintain the arc with a constant flow of current, alternating current from any suitable source is utilized. It is supplied through a connection 19 to conductors 20 and 21, the latter being provided with a fuse 22. A single throw double contact switch 23 closes the circuit to the apparatus, and the current is delivered through conductors 24 and 25 to a voltage regulator 26. The secondary of the voltage regulator 26 is connected by conductors 27 and 28 to a rheostat 29, the coil 30 of which is provided with a variable tap 31. A conductor 32 is connected to a luminous tube transformer 33, as is also the tap 31, so that the desired voltage may be imposed on the primary of the transformer. The secondary 34 of the transformer is connected by conductors 35 and 36 to the electrodes 6 and 7 in the apparatus 5. An ammeter 37 is disposed in series with the conductor 36, so that accurate measurement of the amount of current supplied to the arc can be maintained, and the apparatus adjusted to supply the predetermined amount of current during the operation.

To control the current supplied, a gang switch, comprising segments 38, 39 and 40, is arranged so that the rotors 41, 42 and 43 are operated in unison. The first two contact points on the segment 38 are dead, but the remaining contacts are connected to the conductor 25 and the rotor 41 is connected by a conductor 44 to the switch 23. The first five contacts on the segment 39 are dead, the remaining contacts being connected by a conductor 45 to the terminal of the voltmeter 46. The other terminal of the voltmeter 46 is connected through a resistance 47 and conductor 48 to contacts 6, 7 and 8 of the segment 40. The ninth contact on the segment 40 is connected through a conductor 49, resistance 50 and conductor 51 to the terminal of the voltmeter 46. The general purpose of this arrangement is to permit a lag between the closing of the circuit to the voltage regulator 26 and the closing of the circuit to the voltmeter 46. Thus, the voltmeter does not register until the arc has been formed between the electrodes 6 and 7. The resistance 50 is about half the value of the resistance 47. Either resistance may be used, depending upon the desired range of reading of the voltmeter 46. With the resistance 50 the scale of the voltmeter covers one-half of the range when resistance 47 is used. Thus if voltages in the narrower range are to be read and it is desired to spread such range over the entire scale of the voltmeter for more accurate reading, the rotor 43 is moved to the ninth contact of the segment 40, substituting resistance 50 for resistance 47.

With the apparatus as described, and with a predetermined current value which is observed on the ammeter 37, the arc is struck, and thereafter as the gas flows through the non-turbulent zone about the ends of the electrodes 6 and 7, the variation in voltage is read from the voltmeter 46. Any impurity, such as nitrogen present for example in argon, will immediately cause the voltmeter to register a higher voltage and the percentage of the impurity can be determined immediately by reference to a curve such as that shown in Fig. 3. This curve was plotted by determining the relationship of the arc voltage where the horizontal line represents the percentage of impurity in the gas.

In plotting this curve, samples of argon having a known proportion of nitrogen were delivered to the apparatus having an electrode spacing of one-quarter inch. Current of the value of 30 milliamperes was supplied to the arc. By observing the voltage registered by the voltmeter 46, the corresponding percentage of nitrogen in argon flowing through the apparatus can be readily ascertained. Obviously the apparatus may be similarly calibrated for other gases and the impurities therein.

Figure 3:
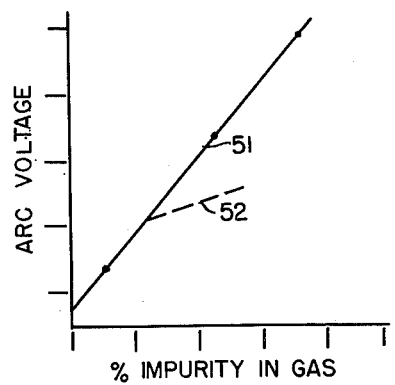
Fig. 3 is a diagram illustrating the results obtainable by the practice of the invention as applied particularly to the determination of nitrogen as an impurity in argon.

In order to secure satisfactory results, it is necessary to observe the arc, which normally has a sharp, clear outline. However, if sufficient current is not supplied, the arc appears simply as a hazy glow between the electrodes. Under such conditions, the curve departs from the line 51 as indicated by the line 52. This is corrected readily by increasing the amount of current supplied until the arc has the characteristic sharp, clear outline. So long as the arc is thus maintained, the readings on the voltmeter correspond to a line comparable to the line 51 when the material treated is argon containing nitrogen. The new line may be slightly displaced from the line 51 because of the increase in current. With other gases, the curve, as shown in Fig. 3, will depart from the line 51 indicated thereon.

With impurities other than nitrogen, which has a marked effect upon the arc voltage even in very small amounts, it may be necessary to increase the sensitivity of the arc by increasing its length. Hence, when the gas impurity does not cause precise, measurable changes of voltage in an apparatus having an arc length of one-quarter inch, the arc length may be increased by merely substituting an apparatus such as that shown in Fig. 1, in which the electrodes are sealed into the apparatus with their ends properly spaced. The apparatus so modified can be made to register arc voltage changes which will indicate the variation in the impurities present in the gas.

Figure 4:
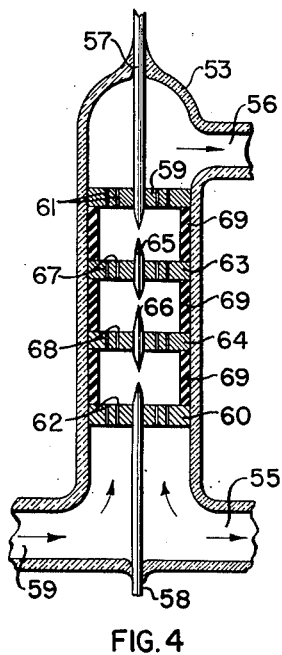
Figs. 4 and 5 illustrate modifications of the apparatus as shown in Fig. 1.

Instead of employing an apparatus such as that shown in Fig. 1, with electrodes spaced at greater distance, it is preferable to employ an apparatus such as that shown in Fig. 4, in which 53 indicates a device, preferably made of glass, having an inlet passage 54, an outlet passage 55 and a bypass outlet passage 56, so that a portion of the gas supplied through the inlet passage 54 is diverted through the device to escape through the passage 56. Electrodes 57 and 58 are sealed through the ends of the device 50 and are supported by members 59 and 60. The members 59 and 60 have openings 61 and 62 therethrough to permit the passage of gas. Intermediate members 63 and 64 support electrodes 65 and 66. Openings 67 and 68 are provided in the members 63 and 64 to permit the passage of gas, and the electrodes 65 and 66 are so arranged as to afford successive gaps. Insulaitng rings 69 hold the members 59, 60, 63 and 64 in properly spaced relation. This construction affords a series of short arcs whereby a greater effective arc length may be obtained without increasing the actual length of any one of the arcs. Greater arc stability is thereby provided. The openings 61, 62, 67 and 68 reduce the flow of the gas through the device. The rings 69 are preferably made of transparent material so that the arcs may be observed.

Figure 5:
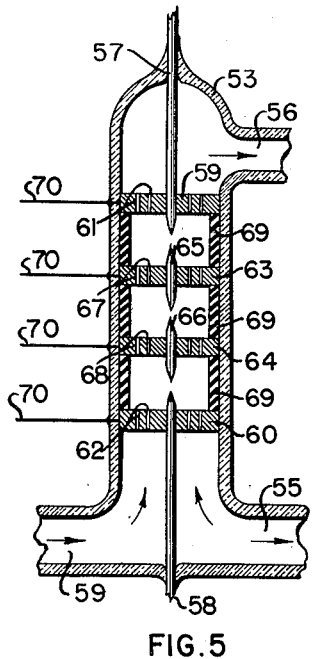

In the modification illustrated in Fig. 5, leads 70 are sealed through the wall of the device 53 and connected to the members 59, 60, 63 and 64 which support the electrodes. The members 59, 60, 63 and 64 are made of conducting material. The leads 70 may be connected to switch terminals to permit one or more of the spark gaps to be shorted out and the effective arc length thereby varied without substitution of a different device. The structure illustrated in Fig. 5 is otherwise identical with that shown in Fig. 4, and the same reference numerals apply thereto.

Figure 6:
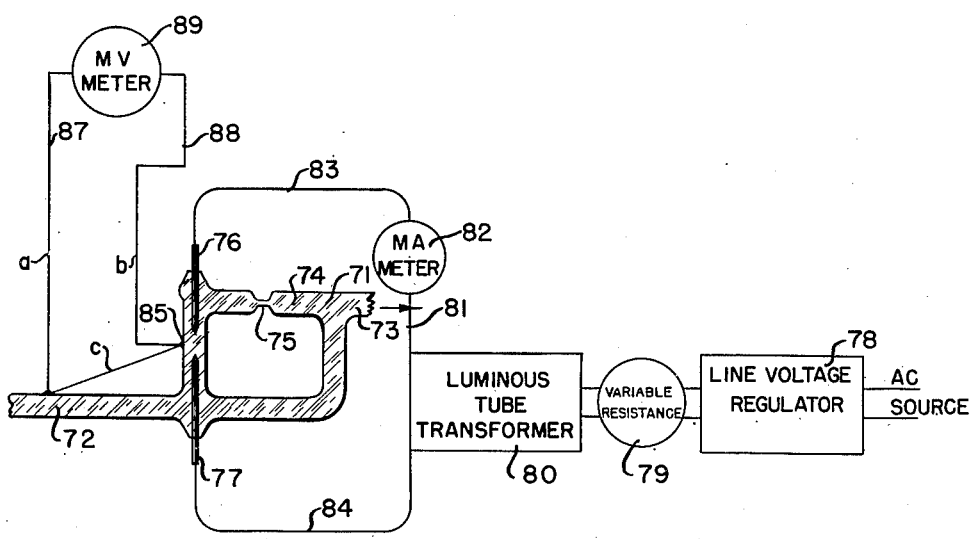
Fig. 6 is a schematic illustration of another modification.

The purpose of the invention, i. e., the determination of impurities in the gas, may be accomplished in a similar manner in the apparatus illustrated in Fig. 6, in which 71 indicates the bypass device, preferably of glass, with an inlet 72, an outlet 73, and a bypass passage 74 having a restriction 75. Electrodes 76 and 77 are sealed in spaced relation in the bypass passage, as in the structure shown in Fig. 1. The gas is fed through the inlet passage 72, and a portion thereof is diverted to the space surrounding the electrodes 76 and 77, where the arc is maintained. Alternating current from a suitable source is supplied to a line voltage regulator 78 and delivered thence to a variable resistor 79 and thence to a luminous tube transformer 80. From the luminous tube transformer 80, current is delivered through a conductor 81 to a milliampere meter 82 and thence through a conductor 83 to the electrode 76. The other electrode 77 is connected by a conductor 84 to the other terminal of the luminous tube transformer 80. Thus, current of the desired characteristic is supplied to maintain the arc between the electrodes 76 and 77.

Instead of measuring the arc voltage, the apparatus determines the presence of impurities by measuring the operating temperature of the gas surrounding the arc. This is accomplished by providing a bimetal member or thermocouple 85, including thermal elements $a$, $b$ and $c$ to measure the temperature differential between the incoming gas and the gas at the arc. The thermal elements $a$, $b$ and $c$ may be of suitable material such as copper, constantan and others in common use. For example, $a$ and $b$ may be of copper and $c$ of constantan. The junctions of the thermal elements may simply be taped or otherwise held in intimate contact with the outside of the gas inlet and the arc chamber. Conductors 87 and 88 connect the temperature measuring device to a millivoltmeter 89. The readings of the millivoltmeter 89 indicate the temperature changes in the gas surrounding the arc. This function is equivalent to the determination of the arc voltage as in the apparatus illustrated in Fig. 1, and the information may be plotted as in Fig. 3 to afford precisely the desired information with respect to the purity of the gas. Thus, by passing a portion of the gas flowing through the apparatus into the region of the arc and determining either the arc voltage or the temperature of the gas surrounding the arc, it is possible to quickly and continuously observe the presence of impurities in the gas stream.

Various changes may be made in the details of the apparatus as described and in the method of employing such apparatus, without departing from the invention or sacrificing the advantages thereof.

I claim:

1. The method of determining the presence of gaseous impurities present in a stream of gas which comprises maintaining a portion of said stream at a substantially constant pressure, maintaining continuously an electric arc of predetermined and constant length in said portion of the flowing stream of gas at a predetermined rate of flow of electric current and measuring the energy consumed in the arc.

2. The method of determining the presence of gaseous impurities present in a stream of gas which comprises maintaining a portion of said stream at a substantially constant pressure, maintaining an electric arc of predetermined and constant length in said portion of the flowing stream of gas at a predetermined rate of flow of electric current and measuring variations of the arc voltage continuously during the operation.

3. The method of determining the presence of gaseous impurities present in a stream of a gas which comprises maintaining a portion of said stream at a substantially constant pressure, maintaining an electric arc between electrodes spaced to a predetermined distance in said portion of the flowing stream of gas at a predetermined rate of flow of alternating current and measuring variations of the arc voltage continuously during the operation.

4. The method of determining the presence of gaseous impurities present in a stream of a gas which comprises maintaining an electric arc in a non-turbulent zone of the flowing stream of gas at a predetermined rate of flow of alternating current, maintaining said zone at a substantially constant pressure and measuring variations of the arc voltage continuously during the operation.

5. In an apparatus for determining impurities present in a stream of gas, an enclosed passage through which the stream of gas flows, spaced electrodes in the passage, means for maintaining the pressure of the gas in the electrode vicinity in said passage substantially constant, means for supplying electric current at predetermined rate to the electrodes to maintain an arc between them and means for measuring the voltage of the arc.

6. In an apparatus for determining impurities present in a stream of gas, an enclosed passage through which the stream of gas flows, spaced electrodes in the passage, means for maintaining the pressure of the gas in the electrode vicinity in said passage substantially constant, means for supplying electric current at predetermined rate to the electrodes to maintain an arc between them, means for measuring the voltage of the arc, and means to prevent return flow of gas through the passage.

7. In an apparatus for determining impurities present in a stream of gas, an enclosed passage through which the stream of gas flows, spaced electrodes in the passage, means for maintaining the pressure of the gas in the electrode vicinity in said passage substantially constant, means for supplying electric current at predetermined rate to the electrodes to maintain an arc between them, including an ammeter to measure the current flowing to the electrodes, and means for measuring the voltage of the arc.

8. In an apparatus for determining impurities present in a stream of gas, an enclosed passage through which the stream of gas flows, spaced electrodes in the passage, means for maintaining the pressure of the gas in the electrode vicinity in said passage substantially constant, means for supplying electric current at predetermined rate to the electrodes to maintain the arc between them and means for measuring the energy consumed in the arc.

9. In an apparatus for determining impurities present in a stream of gas, an enclosed passage through which the stream of gas flows, spaced electrodes in the passage, means for maintaining the pressure of the gas in the electrode vicinity in said passage substantially constant, means for supplying electric current at predetermined rate to the electrodes to maintain the arc between them and means for measuring the rise in temperature of the gas stream between the gas inlet and the region of the arc.

10. The method of determining the presence of gaseous impurities present in a stream of gas which comprises maintaining a portion of said stream non-turbulent and at a substantially constant pressure, maintaining continuously an electric arc of predetermined and constant length in said portion of the flowing stream of gas at a predetermined rate of flow of electric current, and measuring the energy consumed in the arc.

RUDOLPH O. SEITZ.

References Cited in the file of this patent
UNITED STATES PATENTS

| Number | Name | Date |
|---|---|---|
| 274,295 | Edison | Mar. 20, 1883 |
| 1,377,282 | Schafer | May 10, 1921 |
| 1,697,339 | Baker | Jan. 1, 1929 |
| 1,904,059 | Kubach | Apr. 18, 1933 |
| 2,458,601 | Johnson | Jan. 11, 1949 |
| 2,465,377 | Jaeger | Mar. 29, 1949 |